United States Patent [19]
Jörgensen

[11] Patent Number: 5,293,839
[45] Date of Patent: Mar. 15, 1994

[54] CULTIVATION TANK FOR AQUATIC ORGANISMS

[76] Inventor: Leif Jörgensen, Bockmans vei 91, N-7019 Trondheim, Norway

[21] Appl. No.: 863,293
[22] PCT Filed: Dec. 17, 1990
[86] PCT No.: PCT/NO90/00189
§ 371 Date: Aug. 13, 1992
§ 102(e) Date: Aug. 13, 1992
[87] PCT Pub. No.: WO91/09517
PCT Pub. Date: Jul. 11, 1991

[30] Foreign Application Priority Data
Dec. 29, 1989 [NO] Norway ............... 895317

[51] Int. Cl.⁵ .............................. A01K 63/00
[52] U.S. Cl. .................................. 119/232
[58] Field of Search ............... 119/2, 3, 4, 5; 210/169, 407, 416.2, 525

[56] References Cited
U.S. PATENT DOCUMENTS
5,178,093  1/1993  Reese et al. ............. 119/5 X Primary Examiner—Gene Mancene
Assistant Examiner—Thomas Price
Attorney, Agent, or Firm—Dennison, Meserole, Pollack & Scheiner

[57] ABSTRACT

A fish cultivation tank including a suction unit rotatable about the bottom of the tank in response to a falling of the water level within the tank. A combined weight and float assembly moves in response to movement of the water level and is operationally joined to the suction unit to rotatably drive the suction unit in response to a lowering of the water level. The lowering of the water level is effected by a siphoning of water and debris from the tank whereby the siphoning of the debris occurs simultaneously with rotation of the suction unit.

5 Claims, 3 Drawing Sheets

CULTIVATION TANK FOR AQUATIC ORGANISMS

BACKGROUND OF THE INVENTION

The invention concerns a device that is a cultivation tank for aquatic organisms.

Fish tanks are presently either made of plastic, steel, or concrete in a number of designs. The removal of excess feed, excrement and the like is usually done by emptying large volumes of water from the tank to allow technical staff to brush the bottom of the tank clean. If the water outlet and supply is forced to flow by means of a current, there is a better degree of self-cleaning. This however requires considerable amounts of water to be supplied.

Marine fish larva such as cod, turbot, halibut and plaice are too sensitive for such strong water current. Thus the cleaning of tanks for these species has to be done manually by technical staff vacuuming the bottom with a syphon that has a suitable nozzle fitted to the end. This operation is excessively time consuming. In cases where the water is recirculated it is disadvantageous to have a strong water current flowing through the tank.

SUMMARY OF THE INVENTION

The main objective of the present invention is to design a fish cultivation tank that is hygienic, with restricted water motion in the tank and where the required cleaning work is minimal.

This has been realized by a fish cultivation tank including a suction unit having at least one rotating suction arm located adjacent the bottom of the tank and moveable to sweep the bottom of the tank in response to a falling of the water level within the tank. This rotational movement is achieved by a combined weight and float assembly which, in response to a lower of the level of water in the tank, rotationally drives the at least one suction arm. The lowering of the level of water in the tank in turn is effected by a suctioning or siphoning of water and debris from the tank adjacent the bottom. Thus, the removal of debris occurs in conjunction with the rotation of the suction apparatus.

The invention will now be described by means of one example of a design, referring to the enclosed drawings.

Figure 1:
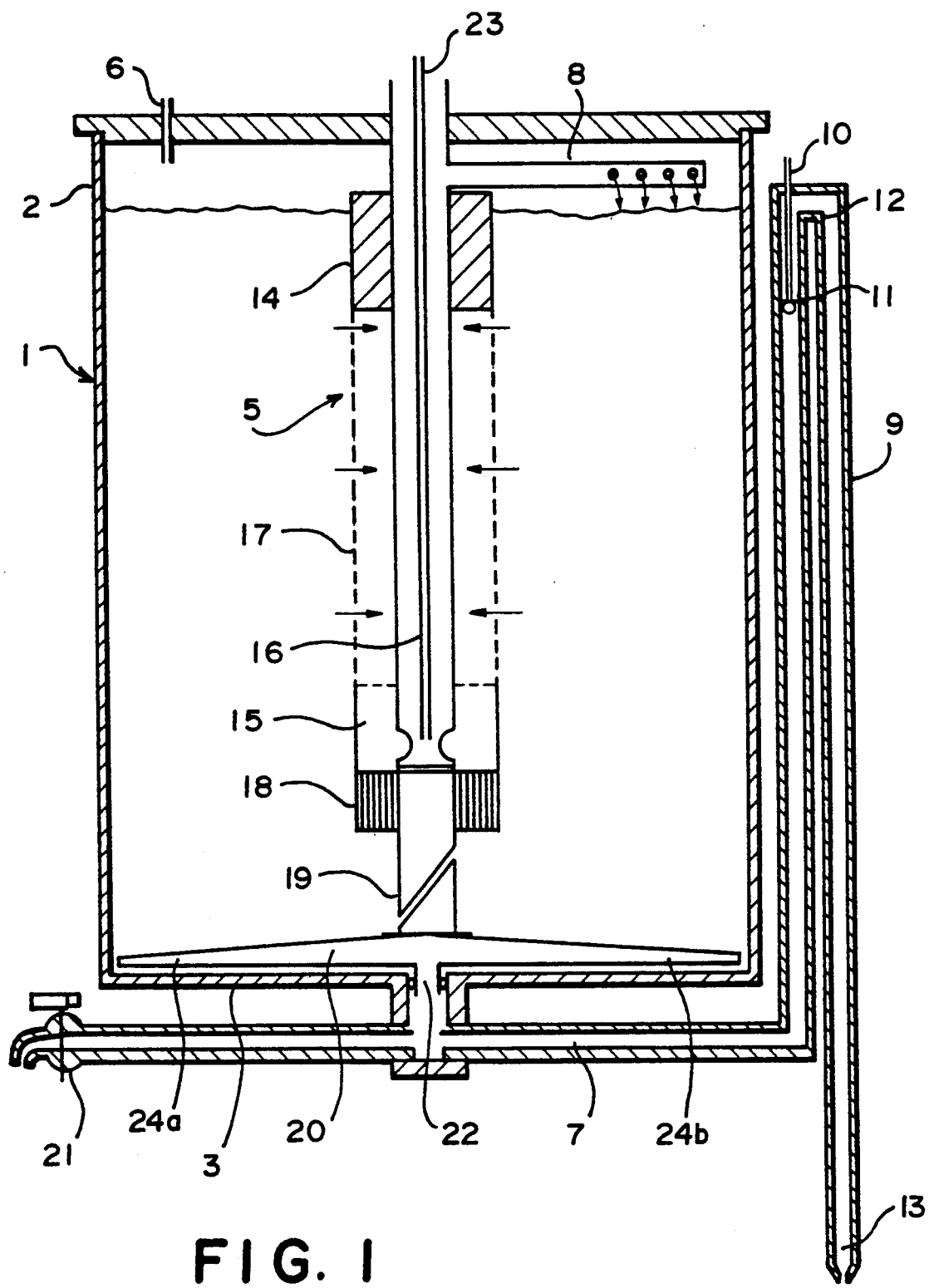
FIG. 1 schematically shows a first, preferred design in accordance with the present invention.

Reference is first made to FIG. 1, that shows a cultivation tank, generally indicated as 1, with a wall, or walls 2 and a bottom 3.

The bottom 3 is essentially circular, and the wall 2 is preferably cylindrical or conical. The bottom can for example be profiled in towards the center. The tank 1 can be covered by a top. The tank 1 has a supply pipe 6 for water, and an external outlet pipe 7 for water and residue.

Figure 3:
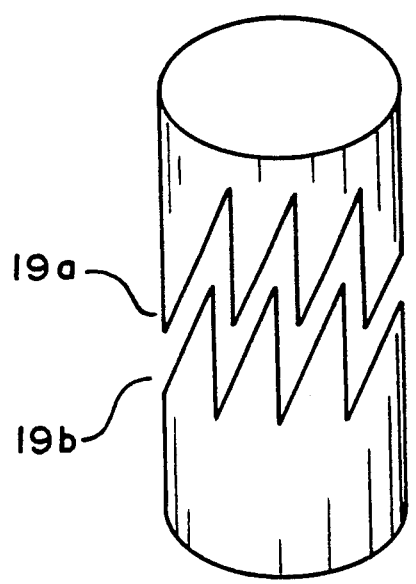

The described fish tank 1 also has a rotating dredge unit 20 that uses suction or scraping to keep the bottom 3 clean of excess feed, excrement, dead eggs and other material lying on the bottom. The rotating suction dredge unit 20 comprises at least one suction arm, preferably two suction arms 24a, 24b. Suction arms 24a, 24b can be fitted with rubber scrapers or brushes to make the cleaning more efficient. The rotating suction dredge unit 20 is located in a recess 22 in the centre of the tank, an advantageous design would combine the recess 22 together with the outlet. At the upper end of the suction dredge unit 20, a cog 19b is located concentrically, which can be seen in greater detail in FIG. 3. The cog 19b has sloping teeth that engage in an equivalent cog 19a. Cog 19a is not rotatable in relation to the bottom 3, but can be moved vertically in relation to it. Cog 19a is connected to a weight 18 and a float 14. Cogs 19a and 19b are designed like those found in standard ballpoint pens. The triangular teeth are tapered to a point. At least one of cogs 19a, 19b has teeth with a side that is parallel to the direction of motion when there is a rising or falling movement. That is, upon downward movement of cog 19a, the teeth of this cog engage the teeth of cog 19b in a known manner and cause axial rotation, also in a known manner, of cog 19b and the suction unit 20 as a result of the interaction of the respective teeth. Cogs 19a, 19b are coordinated so that their teeth become engaged next time there is falling motion. Thus the two cogs 19a, 19b rotate in accordance with each other. This is done by the teeth in the cogs being at different distances, and/or are located asymmetrically to each other. The number of teeth and the ratio between the number of teeth on the respective cogs 19a, 19b help to determine the size of the sector that can be covered each time there is falling motion. An alternative to this is using a double cog, or a mechanism designed like a revolver, with a spring-loaded barb or (claw) that engages the cog and rotatably shifts the cog in a known manner, so that the point of engagement moves each time the weight/float reaches its upper position for axial rotation upon subsequent downward movement.

Water that is sucked through the dredge unit 20 runs through the outlet pipe 7. The outlet pipe is shaped so that it acts as a syphon every time the water in the tank comes above the level limit 12. When this happens, the syphon pipe 9 that is connected to the outlet pipe starts to lead the water out of the tank. The flow of outgoing water stops each time the syphon sucks in air through an air tube 10 which has a valve 11 that opens when the water level comes under the valve 11. This means that there is an outflow of water from the tank 1 at intervals. It is advantageous if the outlet pipe 7 is fitted with a tap or similar means of controlling the rate of emptying.

Figure 2:
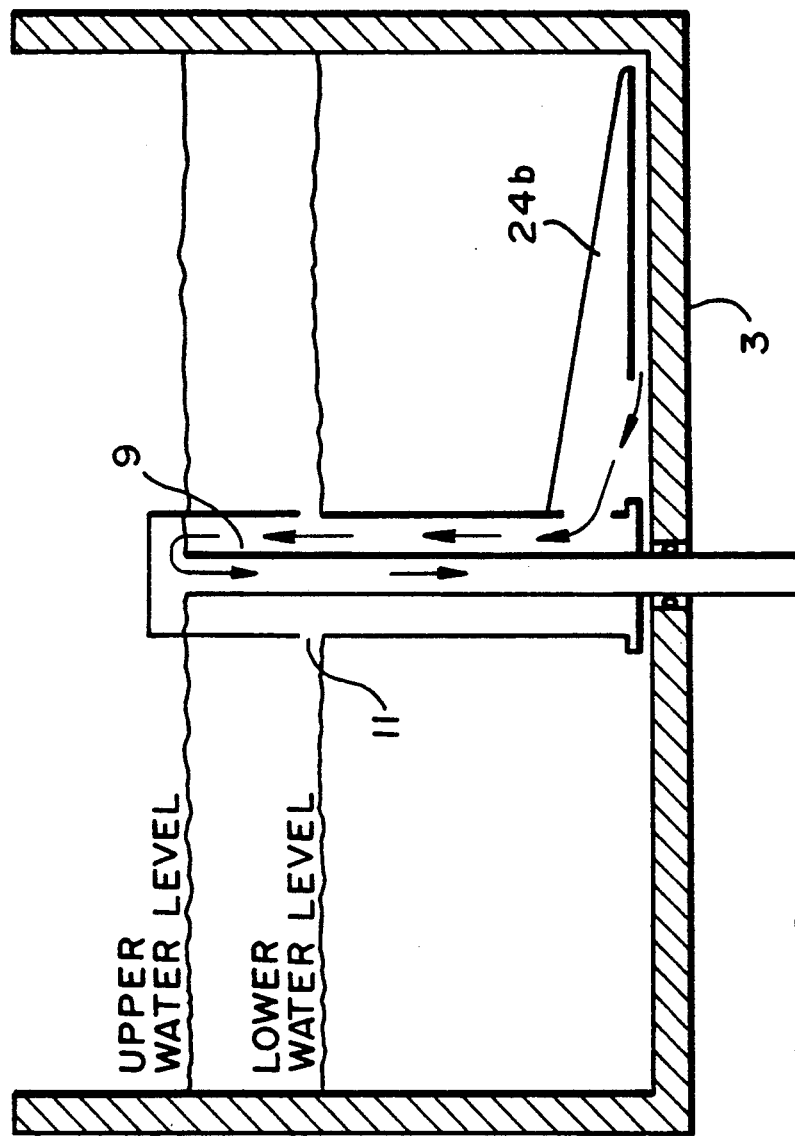
FIG. 2 schematically shows a detail of a second means of designing a water control mechanism for a device in accordance with the present invention, and FIG. 3 schematically shows the cog in FIG. 1 in detail.

In FIG. 2 a design is shown where the water level control mechanism is located inside the tank 1. This design means that there is no need to have a valve in the air tube, however the air inlet 11 in the tank must be fitted with a sieve so that larva are not drawn into it. The syphon pipe 9 is placed centrally in the tank, as shown in FIG. 2, together with the weight/float that is enclosed by a casing.

It is also possible to control the emptying of large quantities of water by means of upper and lower water level switches combined with a magnetic valve, the method required here is already known (not illustrated).

While the water is being emptied, the suction arms 24a, 24b on the dredge unit 20 start to rotate above a limited section of the bottom 3. The suction dredge unit 20 is driven by the falling water level forcing weight 18 and float 14 to sink making the inclined cogs 19a, 19b move in relation to each other, cog 19b also moves in relation to the bottom 3.

Other approaches are to drive the dredge unit with an electric motor or a screw/gear mechanism driven by the incoming water. The water exchange could either be done at intervals or continually.

Rotation must take place between the suction unit and the bottom of the tank, so that it is possible to have a suction unit that remains stationary while the bottom of the tank rotates.

Should live larva come to the bottom 3, they can be forced upwards by carefully allowing water with higher salinity than the rest to flow into the tank through a tap 21. This should preferably be done just before emptying.

An alternative design is mounting the suction unit upside down under a perforated plate. It is also feasible that the suction unit is fitted with a fine grille, brush of something similar that will chase away any live larva that comes too close to the suction unit. Another means of chasing away such larva is an electronic barrier around the suction unit.

It would be an advantage if the tank 1 was equipped with a biological filter, or a protein trap. This could consist of a strainer tube 17, filter chamber 15, riser/aerator 16 and the weight 18.

By forcing air into the lower part of the riser 16, water will be drawn into the riser 16 and out of the spreader pipe 8. This will be effected by water being sucked in through the strainer tube 17 and led into the filter chamber 15. The function of the biofilter will be the removal of ammonium ($NH_4^+$) and ammoniac ($NH_3$) from the water.

I claim:

1. A device with a tank for the incubation or cultivation of aquatic organisms, said tank including a side wall and a bottom, a supply pipe into said tank for the introduction of water, outlet pipe means for water, excess feed, excrement, dead eggs and the like, a suction unit within said tank and connected to said outlet pipe means, said suction unit comprising at least one moveable suction arm operable adjacent said bottom, said at least one suction arm being positioned such that when in motion an area approximately corresponding to the shape and size of the bottom is covered, said outlet pipe means including air inlet means for controlling outflow of water through said outlet pipe means from said tank at intervals, said device also comprising a combined float and weight means in said tank above said suction unit and vertically moveable up and down in response to changes in the level of water in said tank, and cooperating means on said suction unit and said float and weight means for transformation of downward movement of said weight and float means into movement of said at least one suction arm, said downward movement of said weight and float means being in response to downward movement of the water level in said tank as water and waste products are outwardly drawn through said at least one suction arm.

2. The device of claim 1 wherein said cooperating means translates vertical downward movement of said float and weight means into rotational movement of said at least one suction arm.

3. The device of claim 2 wherein said cooperating means comprises first and second cog means respectively on said float and weight means and said suction unit, said first and second cogs having interengaging biasing teeth, said first cog rotationally driving said second cog and attached suction unit upon engagement of said teeth of said first cog with said teeth of said second cog.

4. The device of any one of claims 1, 2 or 3 wherein said outlet pipe means includes an outlet pipe extending from said bottom to a level corresponding to a predetermined maximum level of water in said tank, and a suction pipe extending from said outlet pipe at said maximum level downward below a predetermined minimum level of water in said tank, said air inlet means communicating with said outlet pipe at a level corresponding to said minimum level of water in said tank.

5. The device of claim 4 wherein said outlet pipe means and said air inlet means are within said tank.

* * * * *